United States Patent [19]

Straza et al.

[11] 4,100,787

[45] Jul. 18, 1978

[54] METHOD AND APPARATUS FOR MAKING RECTANGULAR CORRUGATED EXPANSION JOINTS

[75] Inventors: George Thomas Straza; Edward Leon Parr, both of El Cajon

[73] Assignee: Straza Enterprizes, Ltd., El Cajon, Calif.

[21] Appl. No.: 820,083

[22] Filed: Jul. 29, 1977

Related U.S. Application Data

[62] Division of Ser. No. 656,130, Feb. 9, 1976, Pat. No. 4,052,948.

[51] Int. Cl.² ............................................. B21D 13/10
[52] U.S. Cl. ..................................... 72/310; 72/385; 72/388; 113/116 B
[58] Field of Search ............... 72/380, 381, 383, 385, 72/388, 308, 309, 310; 113/116 B, 120 W; 93/84 R, 84 TW

[56] References Cited

U.S. PATENT DOCUMENTS

| 3,434,400 | 3/1969 | Hochfeld | 93/84 R |
| 3,938,244 | 2/1976 | Merle | 113/116 B |

*Primary Examiner*—Michael J. Keenan

*Attorney, Agent, or Firm*—Brown & Martin

[57] ABSTRACT

Forming a corrugated corner piece or a plurality of interconnected integral corrugated corner pieces for forming corrugated, rectangular, expansion joints or bellows by placing a metal blank between a pair of specially constructed hinge plate members. Each hinge plate member comprises a plurality of adjacent elongated plates with the adjacent edges of the plates secured together by tubular hinge elements. The plates pivot together at spaced locations along their lengths, around zig-zag orientated hinge elements that are positioned to lay normal to the side edges of the plate members and interconnect separate parts of the plate members. The blank is placed between the two hinge plates, with the hinge plates being aligned. Aligned pairs of the hinge elements are then held together with the blank sandwiched therebetween. Then every other one of the hinge pairs are moved relative to the other hinge pairs, which pivots the plates and forms the blank into integral corrugated flat sides that are connected by an integral corrugated corner. The tubular hinge elements have a curved outer surface that gives a radius of curvature to the bent portions of the corrugations that allows repetitive successive flexing of the corrugations.

4 Claims, 15 Drawing Figures

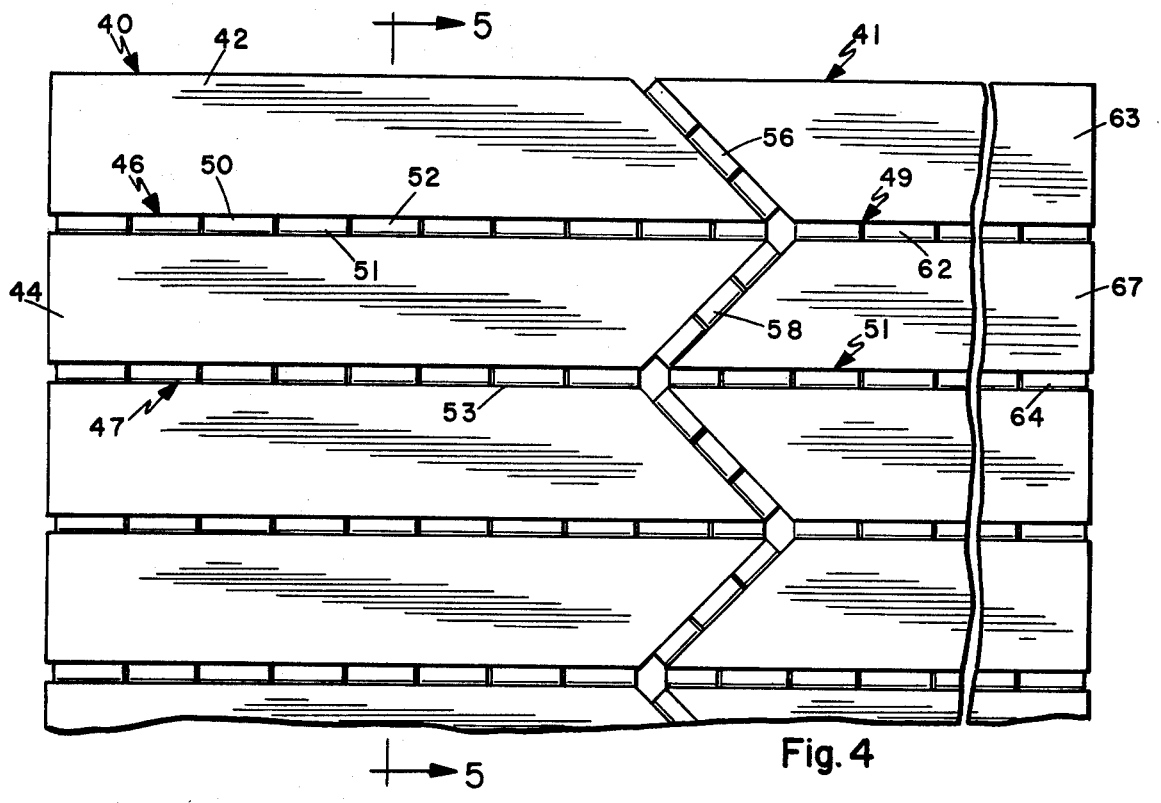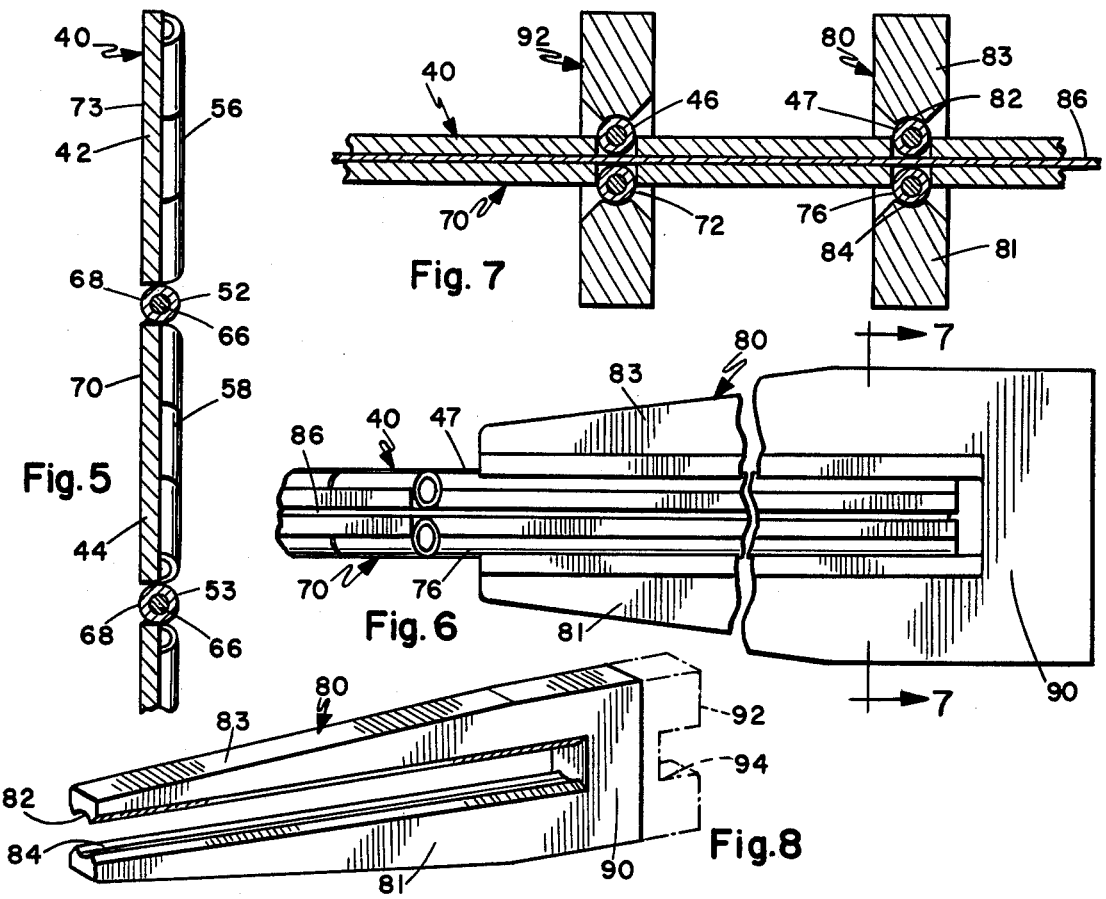

METHOD AND APPARATUS FOR MAKING RECTANGULAR CORRUGATED EXPANSION JOINTS

This is a division of application Ser. No. 656,130, filed Feb. 9, 1976, now U.S. Pat. No. 4,052,948.

BACKGROUND OF THE INVENTION

There are many uses for corrugated type, rectangular expansion joints. While the usual expansion joint is cylindrical, as it is easier to make and in the past has been more reliable, often gas carrying ducts are not circular but are square or rectangular. Thus, interconnecting gas tight, expansion joints are required to be square or rectangular.

In the past, such square or rectangular expansion joints have been made by making a pair of flat corrugated panels members, and then cutting the ends at a 45° angle so that they mate into a corner. The mating edges are then welded. While this forms an expansion joint that can have a desired radius of curvature of the corrugations for flexing, the structure is weak at the weld points, which are not as ductal as the remaining metal. Thus, such expansion joints are subject to failure upon repetitive flexing. Further, such expansion joints are expensive to make.

Thus it is advantageous to have a corrugated corner for making square, rectangular or flat corrugated side expansion joints, that are integral throughout the sides and corrugated corners, and yet have a radius of curvature of the corrugations that allow repetitive successive flexing of the corrugations and the corner corrugations without failure.

SUMMARY OF THE INVENTION

In a preferred embodiment of this invention, a pair of flat dies are constructed of elongated plate members that are joined along their adjacent side edges by tubular hinge lements. Midway along the length of the plate members, plate members are separated and joined by hinge elements that lay at zig-zag angles to the longitudinal length of the plate members. The cross hinge elements for each plate member are in a straight line that is at an angle to a line normal to the side edge of the plate. The line of hinge elements on the adjacent plates are angled to the opposite side of the normal line forming a zig-zag hinge line across the group of plate members.

In use, a metal sheet blank is positioned between the aligned hinge plates. Clevis clamp members are then clamped over the ends of adjacent, aligned hinge members holding the blank sandwiched therebetween. Then every other one of the clevises are moved downwardly relative to the inbetween, adjacent clevises with the plate members being pivoted around the cross hinge elements. This moves the plate members in a manner that forms corrugation along the flat portion of the plate members in the blank, and with a corrugated intersecting bend at the location of the cross hinge elements, forming a corrugated corner.

In another embodiment, the hinge plate members have a plurality of cross hinge element arrangements. The blank is thus formed successively by successively pivoting the plates around the cross hinge elements and bending the blank therebetween into corrugations at successive corners. Where four corners are formed, then the adjacent flat corrugated free ends are joined together by welding or the like forming a completed rectangular or square expansion joint.

The sides of the corrugations generally comprise flat portions that are bent along the longitudinal length thereof to form the corrugations. Since the outer surface of the hinge portions contact the blank sandwiched therebetween at the elongated bend, and since the tube hinge elements have an outer radius; the minimum radius of bend of the formed corrugations have the radius of the hinge elements. Thus sharp creases along the length of the bends in the corrugated blank do not occur, which sharp edges do not flex well and can lead to failure to the expansion joint.

Thus, the method and apparatus provides efficient and yet relatively inexpensive tooling and mechanical operations in forming the corrugated expansion joints from integral blanks of single piece metal sheets. In the second embodiment, only a single weld is necessary to join the free sides of the corrugated corners to form an enclosed rectangular or square, gas tight expansion joint.

It is therefore an object of this invention to provide a new and improved method and apparatus for forming corrugated corner pieces for use in rectangular expansion joints, and in forming enclosed rectangular or multi-side expansion joints.

Other objects and many advantages of this invention will become more apparent upon a reading of the following detailed description and an examination of the drawings, wherein like reference numerals designate like parts throughout and in which:

FIG. 4 is a top plan view of a hinged plate forming die.

FIG. 5 is an enlarged sectional view taken on line 5—5 of FIG. 4.

FIG. 6 is a side elevation view of a portion of an assembled die and blank held by a clamping clevis.

FIG. 7 is a sectional view taken on line 7—7 of FIG. 6.

FIG. 8 is a perspective view of a clamping clevis.

Figure 1:
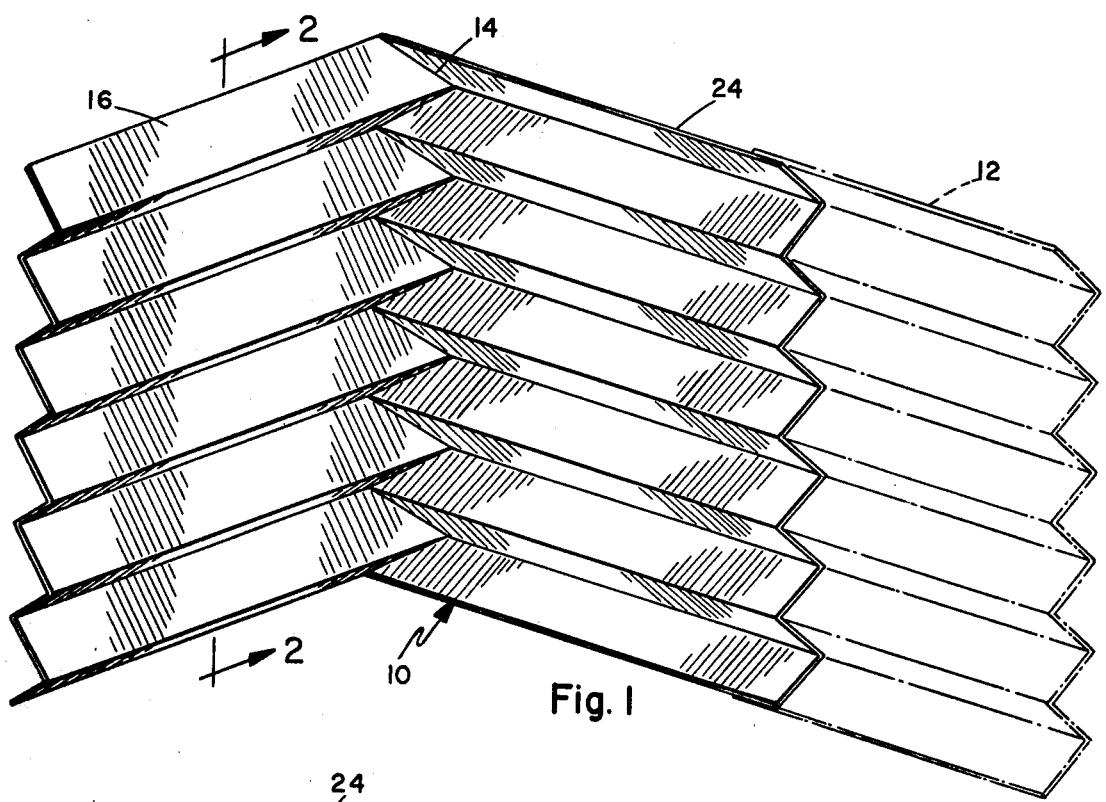
FIG. 1 is a perspective view of a bellows corner element.
Figure 2:
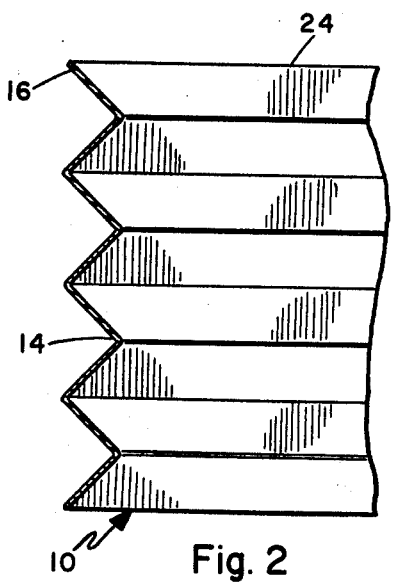
FIG. 2 is a sectional view taken on line 2—2 of FIG. 1.
Figure 3:
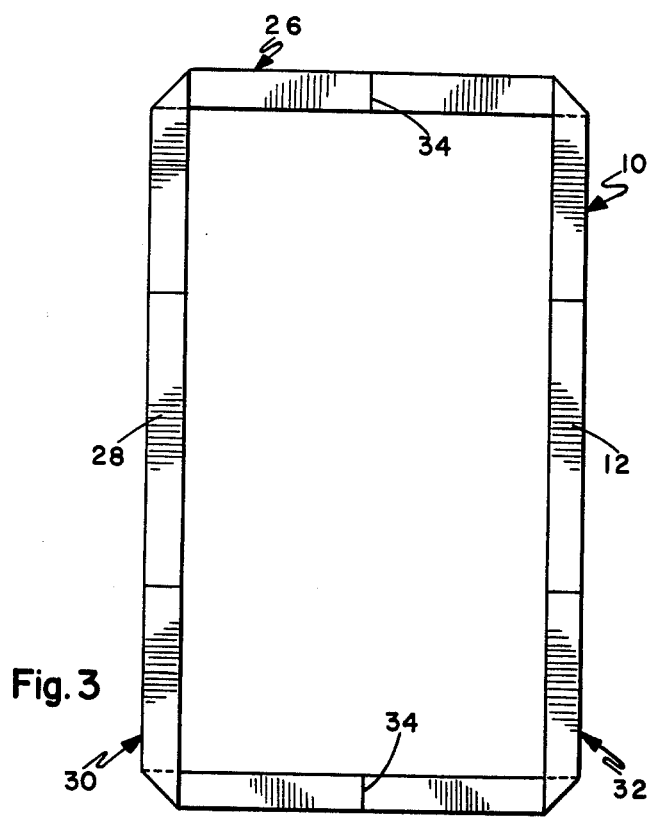
FIG. 3 is a top plan view of a typical bellows assembly.

Referring now to the drawings and to FIG. 1, there is illustrated a typical corrugated corner piece 10 having a corrugated corner 14 and straight corrugated wall sections 16 and 24 extending therefrom. The corrugations have relatively flat side members with radiused longitudinal bend lines 20. The wall sections, as for example wall section 24, may be secured by welding or the like to extensions 12 to extend the length of the straight corrugated walls. The corrugated corner pieces, such as corner pieces 10, 32, 30 and 26, see FIG. 3, may be secured together by welding the free and adjacent ends such as at 34. Also the straight corrugated wall sections 12 and 28 may be added to form rectangular enclosed expansion joints or bellows.

Forming dies, see FIG. 4, are used in forming the corrugated corner pieces. The dies 40 each comprises a plurality of plates, e.g. plates 42, 44, 63 and 67, that are interconnected by hinge members, e.g. hinge members 46, 47, 49 and 51. The hinge members, see FIG. 5, comprise sections of tubing or short cylinders that are welded to the side edges of the plates 42 and 44. For example, the section of tubing 50 is welded to the side edge of plate 42 and the section of tubing 52 is welded to the adjacent side edge of plate 44. A pin 66 then passes through the tubular sections 46 allowing the plates 42 and 44 to rotate on the hinge members. It is to be noted, see FIG. 5, that the sides 68 of the tubular hinge members lie flush with the adjacent side surfaces of plates 73 and 70 of plates 42 and 44. The adjacent ends of the plates are joined together, such as plates 42 and 63, by zig-zag oriented hinge sections 56 and 58. These hinge sections lie in intersecting, angularly positioned lines, that are in a general orientation normal to the longitudinal length of the respective plates 42 and 63.

In forming the blank to the corrugated corner piece, the respective plates comprise upper plate 40, and an identical lower plate 70. A blank 86 of a metal sheet is positioned between the respective side plates 40 and 70. The ends of the plates are held together by a plurality of clevises such as clevis 80. Clevis 80 has a pair of fingers 81 and 83 that are held together by a base end portion 90. Each of the fingers has an internal longitudinal groove 82 and 84, that has an outer cylindrical surface corresponding to the outer surface of the respective tubular hinge members.

In assembly, the clevises are positioned over the adjacent and aligned hinge portions, such as hinge portions 46 and 72, and 47 and 76, as illustrated in FIG. 7. This holds the ends of the die plates 40 and 41 against the lower die plates 70 with the metal sheet 86 sandwiched therebetween. See FIGS. 6 and 7.

Figure 10:
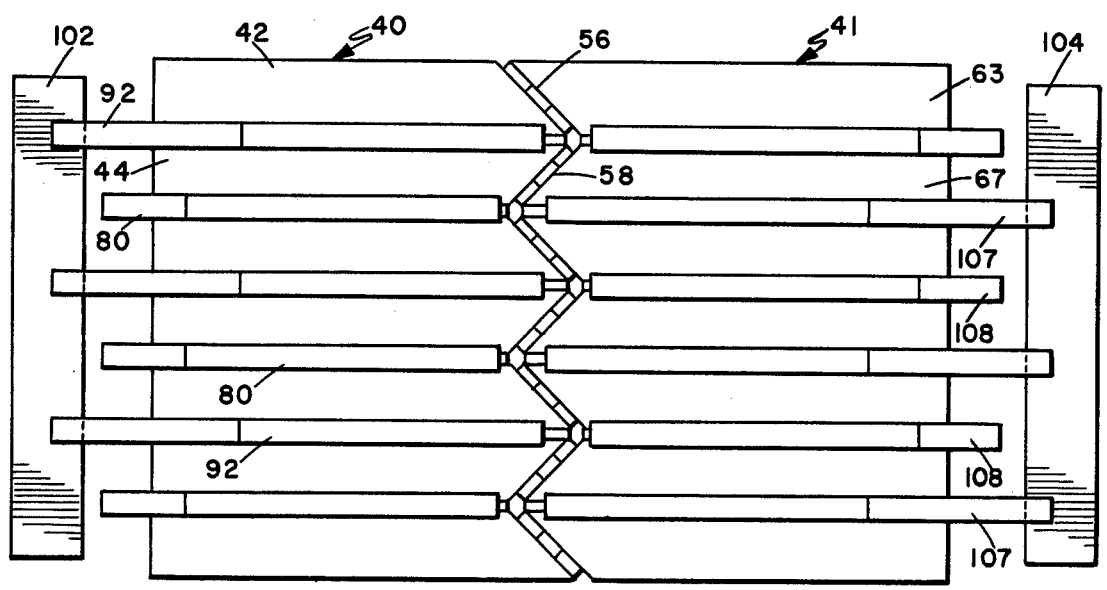
FIG. 10 is a top plan view of a die assembly ready for forming.
Figure 11:
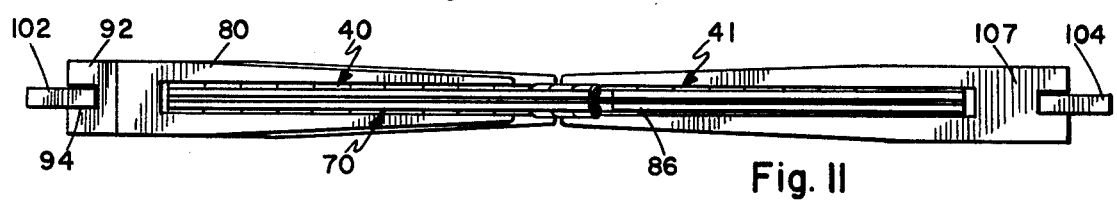
FIG. 11 is a side elevation view as taken from below FIG. 10.
Figure 12:
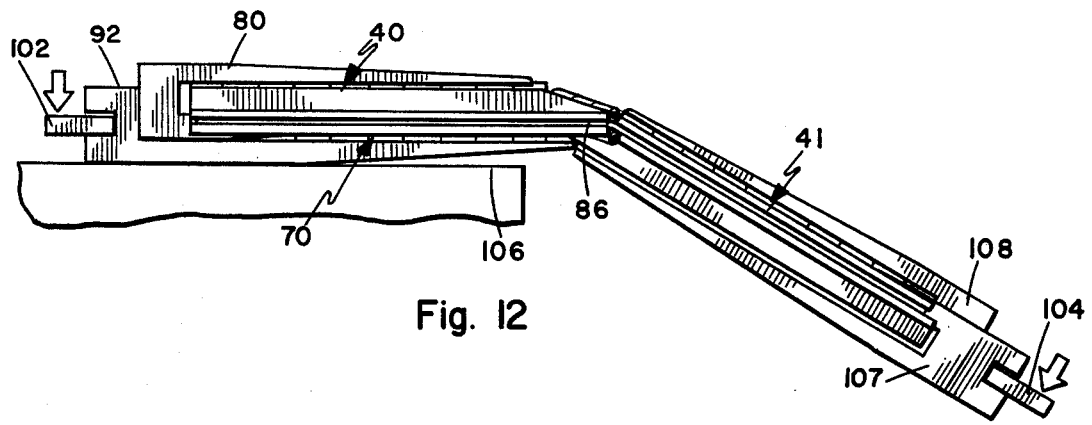
FIG. 12 is a side elevation view similar to FIG. 11, showing the folding action.

In forming the corrugated corner piece, see FIG. 10, every other one of the clevises 80 have an extended piece 92 which has a slot 94. The clevises 92 with the extensions are arranged oppositely on the dies 40 and 41. Operational members, such as members 102 and 104, then pass through the slots 94. With one end of the die, such as end 40 and clevises 80 resting on a surface 106, member 104 is forced downwardly as indicated. The extended die end 41 is then moved downwardly by force on member 104 that pivots the respective plates 63 and 67 downwardly around the intersecting hinge elements 56 and 58 relative to the die end 40. This movement results in clevises 92 remaining abutting against the upper surface of the support 106 and the clevises 107 being moved downwardly, see FIG. 12. In this movement, clevises 80 tend to move up relative to clevises 92 and clevises 108 tend to move downward a lesser amount than clevises 107. This forms the corrugated side members 16 and 24, see FIG. 1, and additionally the blank 86 is formed into a corrugated corner as illustrated in FIG. 1. The angle of the corrugated corner is entirely dependent upon the extent to which member 104 is moved downward and may have any angle. Normally in a square or rectangular enclosed expansion joint, the corrugated corner would be moved to a 90° angle.

Figure 13:
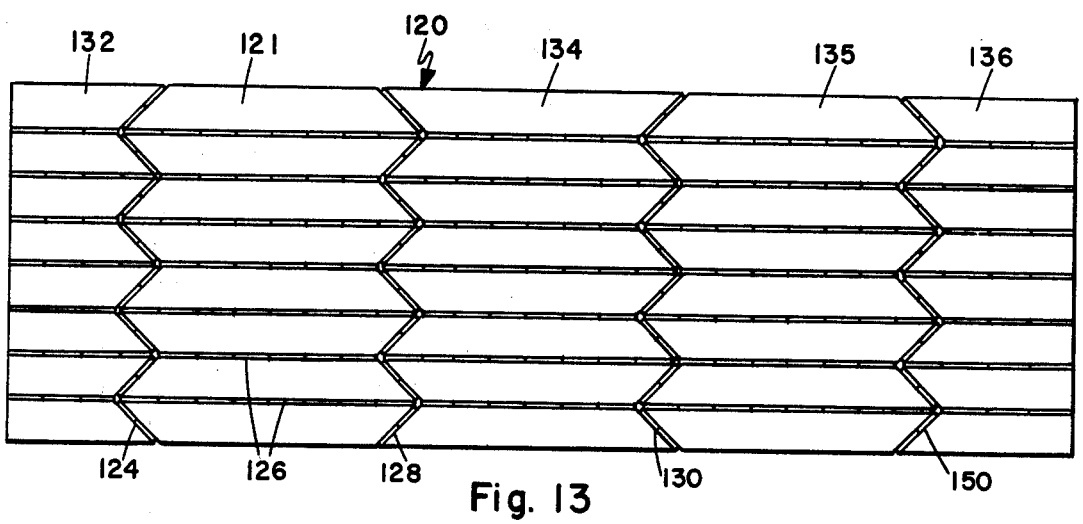
FIG. 13 is a top plan view of a multiple die assembly for forming a complete four corner bellows element.

The die member 120, see FIG. 13, has a plurality of sections, such as sections 132, 121, 134, 135 and 136. These sections of the forming die 120 are interconnected by longitudinal hinge members 126 and intersecting zig-zag hinge sections 124, 128 and 130 and 150. When the upper and lower dies are positioned as illustrated in FIG. 7, then the clevises are inserted over the hinge portions at ends 132 and 136. By moving the end members 132 and 136 inwardly in the direction of the arrows, in FIG. 14 and moving inwardly sections 121 and 135 in the direction of the arrows, then the corrugated side portions are formed in the manner in which the side sections 132, 121, 134, 135 and 136 are interconnected by the corrugated corner pieces 125, 127, 131 and 133. FIG. 15 illustrates the resultant bellows element 152, which is a unitary metal blank that has only a single weld 145.

Figure 9:
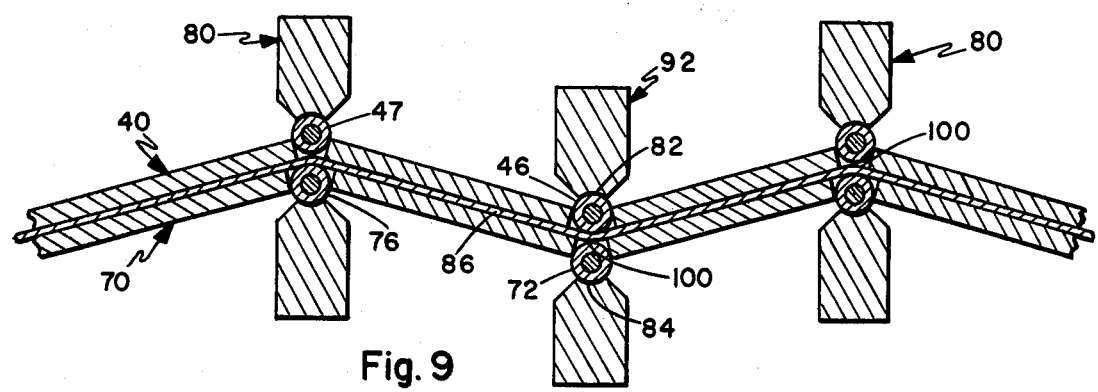
FIG. 9 is a sectional view similar to FIG. 7, showing the folding action.

As illustrated in FIGS. 7 and 9, the tubing sections of the hinge members such as tubing elements 46 and 72, contact the blank in a manner that when the blank is formed, it has corrugated curved edge corners 100 that have a radius of curvature corresponding to the outer circumference of the tubing elements. Thus, the corrugations do not have sharp corners but rather have rounded corners with a sufficient radius that the corner flexes repetitively without failure.

An example of a typical forming die, the plates 42 have a width of four inches, a length of 18 inches and a thickness of 0.187 inches. The hinge elements are made of seamless tubing having an inner diameter of 0.259 inch and a wall thickness of 0.058 inch and an outer diameter of ⅜ inch. The thickness of the metal blank may be in the order of 0.12 inch.

Figure 14:
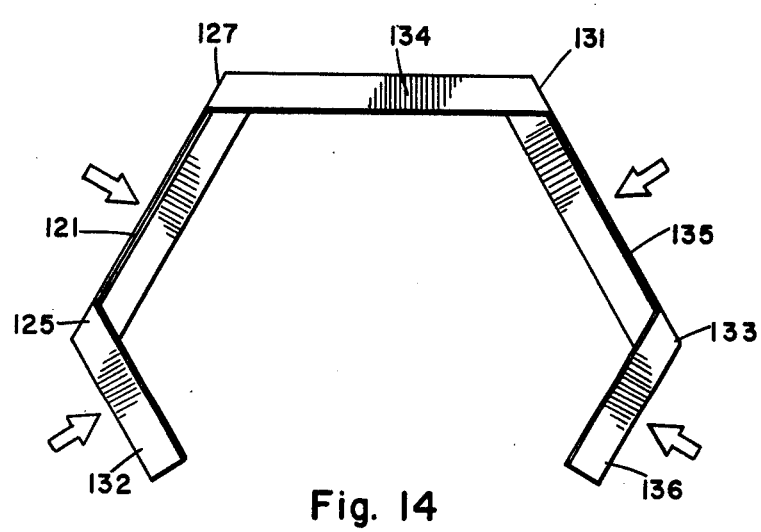
FIG. 14 illustrates a partially folded bellows assembly.
Figure 15:
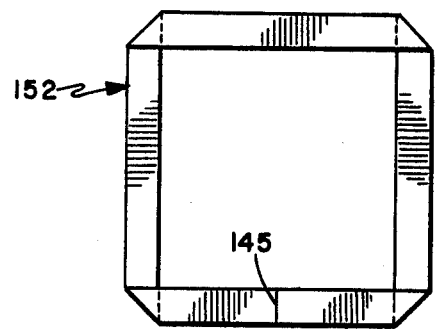
FIG. 15 illustrates the completely folded bellows assembly.

It may be understood, that the lower plate of die 120 used in forming the configuration illustrated in FIG. 14, has a slightly less plate length than the upper plate. This allows for making the inside corners without binding or jamming.

The clevises 80 and 92 are made of strong structural material with finger spacings between grooves 82 and 84 that will accommodate the particular tubular hinge members, as for example members 46 and 72, and the particular thickness of blank 86 that is being formed.

Having described our invention, we now claim:

1. Apparatus for use in making a corrugated corner piece comprising:
   a pair of hinge plate members,
   each of said hinge plate members comprising a plurality of elongated flat plates that are joined together along their adjacent parallel side edges by a tubular hinge member comprising a plurality of tubular hinge elements with a pin fitting through the hinge elements,
   each plate member having at a given location along the length thereof a line of a plurality of hinge elements extending at an angle to the side edges of the plate members,
   the angle of each line of hinge elements being at a cross angle to the hinge element line of the adjacent plate member, forming a zig-zag orientation of the cross hinge elements in a direction normal to the longitudinal edge of each of the plate members,
   and clevis means comprising a pair of adjacent fingers jointed at one end and having internal longitudinal grooves for fitting over adjacent and aligned longitudinal hinge members holding the hinge members and a blank positioned therebetween in a sandwiched alignment.

2. The apparatus as claimed in claim 1 wherein, the tubular hinge members being secured to adjacent side edges of said plate members with one side surface being flush with the flat surface of one side of the adjacent plate members.

3. The apparatus as claimed in claim 2 wherein, said hinge members comprising a plurality of short cylinders wherein selected adjacent ones are secured to the side edges of the plate members for receiving the pin and functioning as hinges.

4. The apparatus as claimed in claim 3 wherein, each of said top and bottom hinge plate members having a plurality of groupings of the cross tubular hinge elements that are substantially aligned.

* * * * *